United States Patent [19]

Dessaint et al.

[11] Patent Number: 4,478,975
[45] Date of Patent: Oct. 23, 1984

[54] COMPOSITIONS AND PROCESS FOR THE OILPROOFING AND WATERPROOFING TREATMENT OF CONSTRUCTION MATERIALS

[75] Inventors: André L. Dessaint, Clermont; Marie-José Lina, Nogent-sur-Oise, both of France

[73] Assignee: Atochem, Courbevoie, France

[21] Appl. No.: 572,026

[22] Filed: Jan. 19, 1984

[30] Foreign Application Priority Data

Jan. 28, 1983 [FR] France ................ 83 01346

[51] Int. Cl.³ ............................................. C08G 18/46
[52] U.S. Cl. ................................. 524/871; 52/515; 52/516; 52/517; 528/53; 528/55; 528/58; 528/59; 528/65; 528/75
[58] Field of Search ................ 524/871; 528/75, 59, 528/65, 53, 55, 58; 52/515, 516, 517

[56] References Cited

U.S. PATENT DOCUMENTS 3,356,628 12/1967 Smith et al. .
3,533,977 10/1970 Read .
4,225,695 9/1980 Schuster et al. .............. 528/75

FOREIGN PATENT DOCUMENTS 1058955 10/1966 United Kingdom .
1095900 12/1967 United Kingdom .
1123829 4/1969 United Kingdom .
1188815 4/1970 United Kingdom .
2077274 11/1981 United Kingdom .

Primary Examiner—Maurice J. Welsh
Attorney, Agent, or Firm—Beveridge, DeGrandi & Kline

[57] ABSTRACT

The invention concerns the oilproofing and waterproofing treatment of construction materials by applying to them a composition which comprises by weight:
(A) from 0.1 to 25% of a fluorinated copolymer formed from
(1) 5 to 70% of a fluorinated ester of the formula:

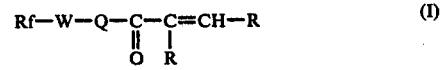

(I)

in which Rf represents a perfluoro-alkyl radical, Q represents an oxygen or sulfur atom, W represent a bivalent linkage, one of the symbols R represents a hydrogen atom and the other a hydrogen atom or an alkyl radical,
(2) 4 to 50% of a monomer of the formula:

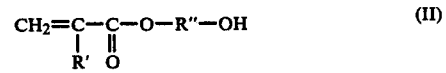

(II)

in which R' represent a hydrogen atom or an alkyl radical and R' represents an alkylene radical and
(3) 0 to 91% of any other monomers'
(B) from 2 to 25% of a polyisocyanate or isocyanate prepolymer;
(C) from 0.1 to 10% of a catalyst; and
(D) one or more diluting solvents to make up to 100%.
This composition, which confers waters repellency, oil repellency, anti-graffiti and anti-billposting properties, stable towards ageing and weathering on the materials treated, may also be used as a mold-removing agent for pieces of concrete cast in a concrete mold.

11 Claims, No Drawings

COMPOSITIONS AND PROCESS FOR THE OILPROOFING AND WATERPROOFING TREATMENT OF CONSTRUCTION MATERIALS

The present invention concerns the oilproofing and waterproofing treatment of construction materials such as bricks, tiles, natural or reconstituted stones, ceramics, plasters, concretes, cements, mortars, wood, glass, metal and plastic materials, and more particularly has for its object compositions and a process for the anti-soiling, anti-graffiti and anti-billposting treatment of the materials.

Products or compositions which permit one or another of these properties to be obtained in construction materials are already known. For example, the silicones effectively confer a waterproof character, but they are not oilproof and it is sometimes necessary to apply a preliminary treatment to the support or substrate; furthermore, these products encourage soiling, which is evidenced by rapid blackening of the treated surfaces.

The use of hydroxylated copolymers of the acrylic-siloxane type, either alone or cross-linked with other resins, has been proposed. However, these products, which are resistant to water, do not provide any resistance to oils.

Also known (see, for example, French Pat. No. 2,313,987) are processes which consist of applying, separately or in admixture, a water-soluble polymeric compound derived from an unsaturated carboxylic acid and a solution of an organo-silicic compound. These compounds are, however, difficult to use and the oilproofing and waterproofing is apparent only after prolonged drying at ambient temperature or after thermal drying. Also, these compounds cannot be applied to fresh concrete and a waiting period of several weeks before treatment is necessary. This is a great handicap in the carrying out of work on site, and prohibits its use in the factory for the treatment of prefabricated elements.

The use of aluminum polyoxostearate, isocyanate prepolymers and acrylic polymers has also been suggested. However, these products lack oilproofing properties and sometimes exhibit weak waterproofing properties.

It has now been found that new compositions which may be applied to fresh concrete as well as to old concrete, and more generally to all construction materials without chaning the appearance of the surface of the materials, confer on them after a very short drying time, simultaneously waterproofing, oilproofing, anti-graffiti and anti-billposting properties which are stable to ageing and weather. These compositions have also proved themselves to be remarkable agents for mold removal, thus allowing in particular, the removal of molds from concrete sections cast in a concrete mold, a technique which is employed, for example, in the construction on site of elements for nuclear plants.

The compositions according to the invention contain by weight;
(A) from 0.1 to 25%, preferably from 1 to 10%, of at least one fluorinated copolymer formed from:
(1) 5 to 70%, preferably from 40% to 65%, of one or more fluorinated esters of the general formula:

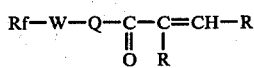  (I)

in which Rf represents a straight or branched chain perfluoroalkyl radical containing 2 to 20 carbon atoms (preferably 4 to 16 carbon atoms), Q represents an oxygen or sulfur atom, W represents a bivalent bond connected to Q by carbon and capable of containing one or more atoms selected from oxygen, sulfur, nitrogen and mixtures thereof, one of the symbols R represents a hydrogen atom and the other a hydrogen atom or an alkyl radical containing 1 to 4 carbon atoms, (2) 4 to 50%, preferably 10 to 30%, of one or more monomers of the general formula:

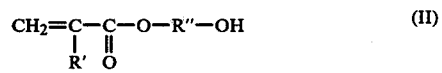  (II)

in which R' represents a hydrogen atom or an alkyl radical containing 1 to 4 carbon atoms and R" represents an alkylene radical containing 2 to 4 carbon atoms, and (3) 0 to 91%, preferably less than 40%, of one or more unsaturated monomers other than 2nd copolymerizable with the monomers of formulas (I) and (II);
(B) from 2 to 25%, preferably from 5% to 10%, of at least one aliphatic or aromatic polyisocyanate or isocyanate prepolymer,
(C) from 0.1 to 10%, preferably 0.2% to 2%, of at least one catalyst; and
(D) one or more diluting solvents to make up to 100%, the content of non-volatiles in these compositions not exceeding 30% and being preferably less than 15%.

As polyfluorinated monomers of formula (I), those preferred correspond to the formula:

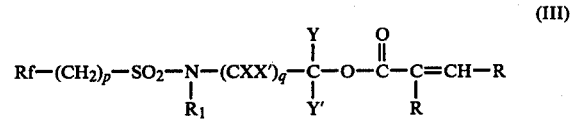  (III)

in which Rf and R have the same significance as above, p represents a whole number from 1 to 20, preferably equal to 2 or 4, q represents a whole number from 1 to 4, preferably equal to 1 or 2, $R_1$ represents a hydrogen atom or an alkyl radical containing 1 to 10 carbon atoms (preferably methyl), a cycloalkyl radical containing 5 to 12 carbon atoms, a hydroxyalkyl radical containing 2 to 4 carbon atoms, an aryl radical or said radical substituted by an alkyl radical containing 1 to 6 carbon atoms, X, X', Y and Y' are identical or different, and each represents a hydrogen atom or an alkyl radical containing 1 to 4 carbon atoms. These monomers may be prepared according to known processes, for example by esterification of corresponding alcohols of the formula:

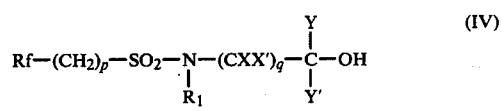  (IV)

described in French Pat. No. 2,034,142, by means of an alkene monocarboxylic acid of the formula:

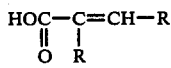 (V)

such as, for example, acrylic acid, methacrylic acid and crotonic acid, in the presence of acid catalysts such as sulfuric acid or p-toluene sulfonic acid. Instead of the alkene monocarboxylic acids of formula (V), their esters, anhydrides or halides may also be used. For economic and practical reasons it has proved particularly interesting to use a mixture of monomers of formula (III) having different Rf radicals.

Further examples of polyfluorinated monomers of formula (I) include the esters of acids of formula (V) with alcohols and thiols of the formulae:

$$Rf-(CH_2)_p-OH \quad (VI)$$

$$Rf-(CH_2)_p-SH \quad (VII)$$

$$Rf-(CH_2)_p-O-(CH_2)_r-OH \quad (VIII)$$

$$Rf-(CH_2)_p-S-(CH_2)_r-OH \quad (IX)$$

$$Rf-(CH_2)_p-(OCH_2CH_2)_r-OH \quad (X)$$

$$Rf-(CH_2)_p-SO_2-(CH_2)_r-OH \quad (XI)$$

$$Rf-CH=CH-(CH_2)_p-OH \quad (XII)$$

$$Rf-SO_2-\underset{R_2}{N}-(CH_2)_p-OH \quad (XIII)$$

$$Rf-COO-(CH_2)_p-OH \quad (XIV)$$

$$Rf-CO-\underset{R_2}{N}-(CH_2)_p-OH \quad (XV)$$

in which Rf and p have the same significance as above, $R_2$ represents a hydrogen atom or an alkyl radical containing 1 to 4 carbon atoms and r is a whole number from 1 to 20, preferably 1 to 4.

Examples of the monomers of formula (II) include the acrylates and methacrylates of alkylene glycols, such as ethylene gylcol and propylene glycol.

Other monomers (3) which may equally be used within the scope of the present invention, are:
lower olefinic hydrocarbons, which may be halogenated or not, such as ethylene, propylene, isobutene, 3-chloro 1-isobutene, butadiene, isoprene, chloro- and dichloro-butadienes, the fluoro and difluoro butadienes, 2,5-dimethyl-1,5-hexadiene, di-isobutylene;
vinyl, allyl or vinylidene halides such as vinyl or vinylidene chloride, vinyl or vinylidene fluoride, allyl bromide, methallyl chloride;
styrene and its derivatives, such as vinyl-toluene, α-methyl styrene, α-cyanomethyl styrene, divinyl benzene, N-vinyl carbazole;
vinyl esters such as vinyl acetate, vinyl propionate, vinyl esters of acids known commercially by the name of "Versatic acids", vinyl isobutyrate, vinyl senecionate, vinyl succinate, vinyl isodecanoate, vinyl stearate, divinyl carbonate;
allyl esters such as allyl acetate and allyl heptanoate;
alkyl-vinyl or alkyl-allyl ethers, which may be halogenated or not, such as cetyl vinyl ether, dodecyl vinyl ether, isobutyl vinyl ether, ethyl vinyl ether, 2-chloroethyl vinyl ether, tetra-allyloxy ethane;
vinyl alkyl ketones, such as vinyl methyl ketone;
unsaturated acids, such as acrylic, methacrylic, α-chloro-acrylic, crotonic, maleic, fumaric, itaconic, citraconic and senecioic acids, their anhydrides and their esters such as vinyl, allyl, methyl, butyl, isobutyl, hexyl, heptyl, 2-ethyl hexyl, cyclohexyl, lauryl, stearyl or cellosolve acrylates and methacrylates, dimethyl maleate, ethyl crotonate, acid methyl maleate, acid butyl itaconate, the diacrylates and dimethacrylates of glycol or polyalkylene glycol, such as ethylene glycol dimethacrylate, or triethylene glycol dimethacrylate, dichloro-phosphato alkyl acrylates and methacrylates such as dichloro-phosphato ethyl methacrylate and the acid phosphate of bis(methacryloyloxyethyl) and methacryloyloxypropyl trimethoxy silane;
acrylonitrile, methacrylonitrile, 2-chloro acrylonitrile, 2-cyano ethyl acrylate, methylene glutaronitrile, vinylidene cyanide, alkyl cyanoacrylates such as isopropyl cyanoacrylate, tris-acrylolyl hexahydro-s-triazine, vinyl trichlorosilane, vinyl trimethoxysilane, vinyl triethoxysilane;
allyl alcohol, allyl glycolate, isobutene-diol, allyloxy ethanol, o-allyl phenol, divinyl carbinol, glycerol α-allyl ether, acrylamide, methacrylamide, maleamide and maleimide, N-(cyanoethyl)acrylamide, N-isopropyl acrylamide, diacetone acrylamide, N-(hydroxymethyl) acrylamide and methacrylamide, N-(alkoxymethyl)acrylamides and methacrylamides, glyoxal bis-acrylamide, sodium acrylate or methacrylate, vinyl sulfonic and styrene p-sulfonic acids and their alkali metal salts, 3-amino crotononitrile, monoallyl amine, vinyl pyridines, N-vinyl pyrrolidone, glycidyl acrylate or methacrylate, allyl glycidyl ether, acrolein, N,N-dimethyl amino ethyl methacrylate, N-tert-butyl amino ethyl methacrylate.

The fluorinated copolymers (A) used according to the present invention are prepared according to techniques which are well-known in themselves, by copolymerization of monomers in a solvent or a mixture of solvents, and the total concentration of the monomers may vary from 5 to 60% by weight. Suitable solvents include aliphatic hydrocarbons (heptane, for example) or aromatic hydrocarbons (benzene, toluene, xylene, trimethyl benzene, for example), ketones (acetone, methyl ethyl ketone, methyl isobutyl ketone, for example), esters (ethyl or butyl acetate, for example), ethers (the methyl or ethyl ethers of ethylene glycol, propyl or butyl ether, for example) and halogenated hydrocarbons (trichlorethylene, perchlorethylene, 1,1,1-trichloro ethane, trichloro-trifluoro ethane, for example).

The reaction temperature may vary within wide limits, that is, between the ambient temperature and the boiling point of the reaction mixture. Preferably operations are carried out between 80° and 100° C.

Copolymerization is carried out in the presence of appropriate polymerization initiators, such as:
the peroxides, such as for example, benzoyl peroxide, lauroyl peroxide, acetyl peroxide, succinyl peroxide, tert-butyl perpivalate;
azo compounds, such as for example, 2,2'-azo bis isobutyronitrile, 2,2'-azo bis-(2,4-dimethyl-4-methoxyvaleronitrile), 4,4'-azo-bis-(4-cyano pentanoic) acid, azo dicarbonamide. The quantity of catalyst to be used may vary between 0.01 and 5%, preferably from 0.1 to 1.5%, in relation to the total weight of the monomers involved.

It is also possible to operate using a source of U. V. radiation, in the presence of photo initiators, such as benzophenone, 2-methyl anthraquinone, or 2-chlorothioxanthone.

If it is required to adjust the molecular weight of the copolymers, it is possible to use chain transfer agents including the alkyl mercaptans (such as tert-dodecyl mercaptan, n-dodecyl mercaptan, n-octyl mercaptan), carbon tetrachloride, triphenylmethane. The quantities to be used, which are a function of the values which are required for the molecular weight, may vary from 0.01 to 3% in relation to the total weight of the monomers, and preferably between 0.05 and 0.5%.

Examples of aromatic or aliphatic polyisocyanates to be used as component (B) of the compositions according to the invention include 2,4- and/or 2,6-toluylene di-isocyanates, 2,4' and/or 4,4'-diphenyl methane di-isocyanates, 1,5-naphthalene di-isocyanate, 4,4'4" tri-phenylmethane tri-isocyanate, 1,3- and 1,4-phenylene di-isocyanates, 1,4-tetramethylene di-isocyanate, and 1,6-hexamethylene di-isocyanate.

Component (B) of the compositions according to the invention is preferably an isocyanate prepolymer, that is a prepolymer of polyurethane with reactive terminal NCO groups, obtained in a manner known in itself by reacting an excess of an aliphatic or aromatic polyisocyanate, such as those mentioned above, with a polyol. Examples of polyols which can be used for the preparation of these prepolymers include products having a molecular weight from 62 to 5,000 such as ethylene glycol, diethylene glycol, polyethylene glycols, 1,3-propane diol, 1,4-propane diol, 1,6-hexane diol, glycerol, trimethylol propane, macromolecular polyethers obtained by condensation of alkylene oxides (in particular, ethylene oxide and propylene oxide) with polyols of low molecular weight as mentioned above, as well as hydroxylated polyesters, the molecular weight of which lies within the range indicated above.

Catalysts (C) to be used according to the invention include:
tertiary amines such as for example, triethylamine, triethylene diamine (DABCO), N-methyl morpholine, N,N,N',N'-tetramethyl butane 1,3-diamine, N-methyl diethanolamine, N,N,N',N'-tetramethyl ethylene diamine, N,N-dialkyl alkanolamines, the alkyl and hydroxyalkyl radicals of which may contain 1 to 4 carbon atoms, N,N-diethyl cyclohexylamine and N,N,N',N'-tetramethyl methane diamine;
tin salts such as for example, tin dibutyl dilaurate, tin octoate, tin oleate and tin dibutyl di(2-ethyl hexanoate);
lead salts such as for example, lead octoate, or lead naphthenate.

As diluting solvents (D) there may be used aliphatic or aromatic hydrocarbons which may be halogenated or not, ethers, esters, ketones or a mixture of such solvents. Examples of these solvents have been indicated previously in connection with the preparation of fluorinated copolymers (A).

The duration of the "pot life" of the compositions according to the invention clearly depends on many factors, notably the nature and the respective proportions of the components used. It is generally between 8 and 48 hours.

The application of the compositions according to the invention may be carried out in one or more layers according to techniques which are well-known in themselves, for example, by spraying, immersion, spreading with brush or roller, so as to deposit 100 to 800 g of the composition according to the invention per $m^2$ of surface being treated, preferably 200 g to 400 g/$m^2$.

According to another variant of the present invention, it is also possible to carry out the application by first depositing a solution of component (A) onto the support to be treated, and then a solution of component (B), or conversely. Catalyst (C) may be indistinctly placed in the solution of component (A) or in that of component (B), or in both.

In order to evaluate the performances of the substrates treated according to the invention, the following tests were conducted:

Oil Repellency Test

Oil repellency was measured according to the method described in the "AATCC Technical Manual", Test Method 118, which evaluates the failure of the substrate to be wetted by a series of oily liquids, the surface tensions of which are weaker and weaker.

Water Repellency Test

In order to test the water-repellency of treated concrete, plates of concrete with dimensions of 50 cm×8 cm×1.5 cm are placed on a metal frame so that they have an inclination of 45°. 3 cm from the top of these plates a tube, 2 cm in diameter and pierced every 2 centimeters by a hole 0.2 cm in diameter, and connected to a water supply, allows the plates to be sprinkled. The percentage of surface wetted after one hour of continuous sprinkling of the plates is noted.

On other supports (for example, wood), water repellency has been measured according to the method described in the "AATCC Technical Manual", Test Method 22, which evaluates the failure of a treated surface to be wetted by water.

Anti-Billposting Test

To a plate of the support or substrate to be tested there is applied by the backward and forward movement of a brush a 40 g/liter solution of wall-paper adhesive "MAXI COLLE GEPE", and then three squares of paper with dimensions of 8 cm×8 cm and weight of 65 g/$m^2$ are adhered thereto, after which the plate is arranged vertically 40 cm away from a "CALOR" ventilating fan.

After 5 hours of fanning, grading from 0 to 5 is carried out in the following manner;

5: the three squares of paper become unstuck by themselves, under the simple effect of the ventilation.

4: two squares of paper become unstuck by themselves.

3: one square of paper comes unstuck by itself.

2: none of the squares of paper come unstuck by themselves, but it is possible to completely remove them by manual pulling.

1: none of the squares of paper come unstuck by themselves, and they can only be partially removed by manual pulling.

0: to remove the squares of paper it is necessary to have recourse to other means (washing, scraping, etc.).

Anti-Graffiti Test

A black paint (Noir Lux No. 20 "Autoraccord" sold commercially by the BERSOL Organization) is sprayed onto a plate of the support or substrate under test arranged vertically, using an aerosol device. This is allowed to dry for 24 hours and then cleaning of the plate is carried out by simple irrigation with methyl ethyl ketone. Cleaning is stopped when the solvent extracts no more of the paint, and grading from 0 to 5 is carried out in the following manner:

5: the paint does not spread onto the plate; writing is not possible. After cleaning with methyl ethyl ketone, the plate regains its original appearance; no trace of the paint remains.

4: it is possible to write on the plate, but after cleaning with methyl ethyl ketone, the plate has recovered its original appearance; no trace of paint remains.

3: quasi-total disappearance of the paint after cleaning with methyl ethyl ketone, only a faint trace remains.

2: after cleaning with methyl ethyl ketone, there is a partial and heterogeneous attenuation of the graffiti.

1: after cleaning with methyl ethyl ketone, there is only a very slight attenuation of the graffiti.

0: cleaning has no effect.

The following examples, in which the parts and percentages are expressed by weight unless indicated otherwise, illustrate the invention without limiting it.

EXAMPLE 1

Into a reactor with a capacity of 500 parts by volume fitted with a stirrer, a reflux condenser, a thermometer, a supply of nitrogen and a heating device, were introduced 40 parts of butyl acetate, 40 parts xylene, 20 parts of butyl methacrylate, 20 parts of 2-hydroxy ethyl methacrylate, 20 parts of acetone and 60 parts of a mixture of polyfluorinated monomers of the formula:

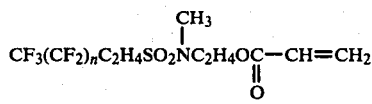

wherein n is equal to 3, 5, 7, 9, 11, 13 and 15 in relation to the mean weights, respectively, of 1, 50, 31, 10, 3, 1, 1. The mixture was heated under an atmosphere of nitrogen up to 100° C. The catalyst was then added, which was composed of 1 part of lauroyl peroxide and 0.15 part of tert-butyl perpivalate. The solution was held at 100° C. for 6 hours, adding 0.15 part of tert-butyl perpivalate every two hours. After cooling, a solution (S1) of a copolymer according to the invention was obtained. This solution contained 50% of non-volatile material and its fluorine content was 14%.

Using this solution, a composition (C1) according to the invention was prepared, containing:
Solution (S1)... 4 parts
50% solution in a 90/10 mixture of aromatic hydrocarbons and ethyl acetate, of a prepolymer of hexamethylene di-isocyanate, partially condensed with a linear polyether and having a NCO content of 8.5% (DESMODUR E 3150 from the BAYER company)... 15 parts
tin dibutyl dilaurate 0.2 part
butyl acetate 80.8 parts This composition was applied in two layers at an interval of two hours, at a rate of 125 g/m² each, to plates of concrete with dimensions of 50 cm × 8 cm × 1.5 cm, corresponding to a dressing quality of concrete, which is white and smooth such as is currently used for facades. The plates were prepared in the following manner: 390 parts of LAFARGE Superblanc cement were mixed with 510 parts of white sand with granulometry of 0-1, 860 parts of a crushed white Pyrenean marble with granulometry of 3-12, 490 parts of a crushed white Pyrenean marble with granulometry of 2-7, and 215 parts of water. Then this mixture was cast in metal molds which were shaken on a vibrating table for 30 seconds. These were then left to stand for 24 hours and the plates were removed from the molds and left to dry for a further 3 days at ambient temperature.

As a means of comparison, the following compositions were applied in the same way to similar plates:

Composition (Ca)

60% aluminum polyoxostearate in white spirit ... 17 parts
white spirit ... 83 parts Composition (Cb)

Copolymer based on butyl methacrylate (60%) and methyl methacrylate (40%) ... 10 parts
Butyl acetate ... 45 parts
xylene ... 45 parts Composition (Cc)

50% solution of the isocyanate prepolymer used in composition (C1) ... 20 parts
Butyl acetate ... 80 parts Composition (Cd)

Solution (S1) ... 20 parts
butyl acetate ... 80 parts

The following table summarizes the results obtained by submitting plates treated with compositions (C1) to (Cd) and an untreated plate, to the tests described previously.

TABLE 1

| Composition | Water repellency Surface wetted | Oil repellency | Anti-billposting test | Anti-graffiti test |
|---|---|---|---|---|
| C1 | 0% | 7 | 5 | 3 |
| Ca | 50% | 0 | 2 | 2 |
| Cb | 0% | 0 | 2 | 2 |
| Cc | 100% | 0 | 1 | 1 |
| Cd | 40% | 5 | 1 | 0 |
| Untreated plate | 100% | 0 | 0 | 0 |

Examination of the results shows that only composition (C1) according to the invention presents at the same time good water repellency, oil repellency, anti-billposting and anti-graffiti properties, thus giving total protection against natural or deliberate degradation.

EXAMPLE 2

Into a reactor identical with that of Example 1 but having a capacity of 1000 parts by volume were introduced 57 parts of methyl isobutyl ketone, 7.5 parts of 2-hydroxy ethyl methacrylate and 7.5 parts of stearyl methacrylate. An atmosphere of nitrogen was introduced and heating continued up to 75° C. Then 0.075 part of lauroyl peroxide and also 0.1 part of tert-butyl perpivalate were added. A temperature of 75° C. was maintained for two and a half hours and then 0.075 part of lauroyl peroxide and 0.1 part of tert-butyl perpivalate were again added and 75° C. maintained for a further half-hour. Then 30 parts of 2-hydroxy ethyl methacrylate, 30 parts of a mixture of polyfluorinated monomers such as those described in Example 1, 11 parts of acetone, 300 parts of methyl isobutyl ketone, 0.3 part of lauroyl peroxide and 0.1 part of tert-butyl perpivalate were introduced and the temperature of 75° C. was regained and maintained. After 1 hour, 0.1 part of tert-butyl perpivalate was added, after 2 hours 0.3 part of lauroyl peroxide and 0.1 part of tert-butyl perpivalate, and after 3 hours 0.1 part of tert-butyl perpivalate. A temperature of 75° C. was then maintained for a further hour and the mixture cooled to 25° C. An emulsion (E1) of a fluorinated copolymer according to the invention was thus obtained. This emulsion contained 17% of non-volatile material and its fluorine content was 3.1%.

A composition (C2) according to the invention was prepared by mixing 12 parts of emulsion (E1), 15 parts of prepolymer DESMODUR E3150, 0.2 parts of tin dibutyl dilaurate and 72.8 parts of methyl ethyl ketone. A layer of composition C2 was applied by brush at a rate of 200 g/m² to a concrete plate identical with those used in Example 1.

This was left to dry for 24 hours at ambient temperature before testing. In comparison with an untreated plate, the characteristics of the plate treated with the composition according to the invention are as follows:

TABLE 2

|  | Water repellency Surface wetted after 1 hour of spraying | Oil repellency |
|---|---|---|
| Untreated plate | 100% | 0 |
| Plate treated with composition C2 | 0% | 7 |

EXAMPLE 3

Into a reactor identical with that in Example 1 were charged 15 parts of butyl methacrylate, 35 parts of 2-hydroxy ethyl methacrylate, 100 parts of butyl acetate and 50 parts of a mixture of polyfluorinated monomers of the formula:

wherein n is equal to 3, 5, 7, 9, 11, 13 in relation to the mean weights respectively of 1, 50, 31, 10, 3, 1. An atmosphere of nitrogen was introduced and the mixture heated to 100° C., and then 0.2 part of tert-butyl perpivalate and 1 part of lauroyl peroxide were added. The temperature was held at 100° C. for 8 hours, adding at the second, fourth and sixth hours 0.2 part of tert-butyl perpivalate. After cooling, a solution (S2) of a copolymer according to the invention was obtained. This solution contained 50% non-volatile material and its fluorine content was 15%.

A composition (C3) according to the invention was prepared by mixing 0.4 part of solution S2, 15 parts of DESMODUR E 3150 prepolymer, 0.2 part of tin dibutyl dilaurate and 84.4 parts of methyl ethyl ketone. A layer of composition C3 was applied to a concrete plate identical with those used in Example 1, using a brush and at a rate of 125 g/m², and this was left to dry for 24 hours at ambient temperature. In comparison with an untreated plate, the characteristics of the plate treated with the composition according to the invention are as follows:

TABLE 3

|  | Water repellency Surface wetted after 1 hour of spraying | Oil repellency |
|---|---|---|
| Untreated plate | 100% | 0 |
| Plate treated with composition C3 | 0% | 6 |

EXAMPLE 4

Into a reactor identical with that in Example 1 were charged 12.5 parts of γ-methacryloyloxypropyltrimethoxy silane, 7.5 parts of 2-hydroxy ethyl methacrylate, 300 parts of 1,1,1-trichloroethane, 2 parts of lauroyl peroxide and 17.5 parts of polyfluorinated monomer of the formula:

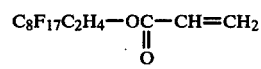

An atmosphere of nitrogen was introduced and heating carried out at 70° C. for 6 hours. After cooling, a solution (S3) of a copolymer according to the invention was obtained. This solution contained 11% of non-volatile material and its fluorine content was 3.1%.

A composition (C4) according to the invention was prepared by mixing 4 parts of solution S3, 15 parts of DESMODUR E3150 prepolymer, 0.2 part of tin dibutyl dilaurate and 80.8 parts of butyl acetate. A layer of composition C4 was applied to a tile of baked clay at a rate of 200 g/m² and this was allowed to dry for 24 hours at ambient temperature.

In order to test the water-repellency a drop of water (about 0.05 ml) was applied to the tile under test, and this was then covered with a watch glass which was greased to ensure a seal and thus prevent evaporation. The time for penetration of the drop of water was noted. The time of penetration on an untreated tile was 3 minutes, but for the tile treated with composition C4 according to the invention it was more than 2

The following results have been obtained by operating in the same way, on a TUFFEAU natural stone:
Untreated stone—instantaneous penetration
Stone treated with C4—time of penetration more than 2 days

EXAMPLE 5

Into a reactor identical with that in Example 1 were charged 6.5 parts of γ-methacryloyloxypropyltrimethoxy silane, 1 part of 2-hydroxy ethyl methacrylate, 150 parts of 1,1,1-trichloroethane, 1 part of lauroyl peroxide and 14 parts of the same mixture of polyfluorinated monomers as in Example 1. A temperature of 70° C. was reached and maintained for 8 hours. After cooling, a solution (S4) of a fluorinated copolymer according to the invention was obtained. This solution contained 12.5% of non-volatile material and its fluorine content was 3.7%.

In order to indicate the mold removal properties of the claimed compositions, operations were carried out as follows:

A composition (C5) according to the invention was prepared by mixing 10 parts of solution S4, 10 parts of a mixed aliphatic-aromatic polyisocyanate corresponding to the following schematic formula:

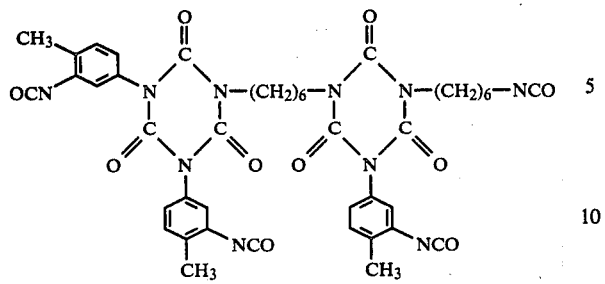

with a content of 10.5% of free N=C=O, in 60% solution in butyl acetate and known under the name DE-SMODUR HL (BAYER), 0.6 part of tin dibutyl dilaurate and 79.4 parts of butyl acetate. A layer of this solution C5 was applied to a plate of concrete identical with those used in Example 1 at the rate of 220 g/m², and this was left to dry for 24 hours. A metal frame 48 cm in length, 6 cm in width and 1.5 cm in height was placed on the plate thus treated and also on an untreated plate, and then inside this frame was cast a mortar of the same composition as in Example 1 and this was left to dry for 15 hours. After drying, it was shown that the mortar poured onto the plate treated with solution C5 had absolutely not adhered, thus forming a second plate which detached itself perfectly from the first. By contrast, in the case of the untreated plate, it was impossible to separate the two pieces.

EXAMPLE 6

Into a reactor identical with that in Example 1 were charged 5 parts of 2-hydroxy ethyl methacrylate, 85 parts of stearyl methacrylate, 80 parts of methyl isobutyl ketone and 10 parts of the same mixture of polyfluorinated monomers as in Example 1. After heating to 90° C., 1 part of lauroyl peroxide and 0.2 part of tert butyl perpivalate were added. The temperature was held at 90° C. for 6 hours, while 0.2 part of tert butyl perpivalate were added after 2 and 4 hours reaction time. After cooling, a solution (S5) of a fluorinated copolymer according to the invention was obtained. This solution contained 55% non-volatile material and its fluorine content was 2.5%.

A composition (C6) according to the invention was prepared by mixing 8 parts of solution S5, 10 parts of DESMODUR E3150 prepolymer, 0.1 part of tin dibutyl dilaurate and 81.9 parts of butyl acetate. A layer of composition C6 was applied to a plank of oak at a rate of 350 g/m², and this was left to dry for 24 hours at ambient temperature. In comparison with a similar untreated plank, the performances obtained with composition C6 were as follows:

TABLE 4

| | Treated oak plank | Untreated oak plank |
|---|---|---|
| Water repellency (Spray test) Standard AATCC 22 | 100 | 0 |
| Oil repellency Standard AATCC 118 | 7 | 0 |

What is claimed is:
1. A composition for the treatment of construction materials which comprises, by weight:

(A) from 0.1 to 25% of at least one fluorinated copolymer formed from:
(1) 5 to 70% of one or more fluorinated esters of the formula:

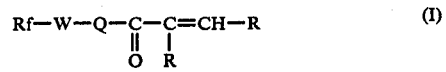

in which Rf represents perfluoro alkyl with straight or branched chain containing 2 to 20 carbon atoms, Q represents oxygen or sulfur, W represents a bivalent bond connected to Q by carbon and capable of containing one or more atoms of a member selected from oxygen, sulfur, nitrogen and mixtures thereof, one of the symbols R represents hydrogen and the other symbol R represents hydrogen or alkyl containing 1 to 4 carbon atoms:

(2) 4 to 50% of one or more monomers of the formula:

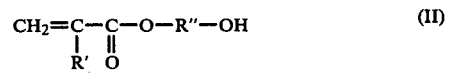

in which R' represents hydrogen or alkyl containing 1 to 4 carbon atoms and R" represents alkylene containing 2 to 4 carbon atoms, and
(3) 0 to 91% of one or more unsaturated monomers other than and copolymerizable with the monomers of formulas (I) and (II);
(B) from 2 to 25% of at least one polyisocyanate or isocyanate prepolymer which may be aliphatic or aromatic;
(C) from 0.1 to 10% of at least one catalyst; and
(D) one or more diluting solvents to make up to 100%, the content of non-volatiles in the composition not exceeding 30%.

2. The composition according to claim 1 containing 1% to 10% of fluorinated copolymer (A), 5 to 10% of polyisocyanate or isocyanate prepolymer (B) and 0.2% to 2% of catalyst (C).

3. The composition according to claim 1 wherein the fluorinated copolymer (A) is formed from 40% to 65% of fluorinated ester or esters of formula (I), 10% to 30% of monomer or monomers of formula (II) and less than 40% of other monomers.

4. The composition according to claim 1, wherein the content of non-volatile materials is less than 15%.

5. The composition according to claim 1, wherein the fluorinated ester corresponds to the formula:

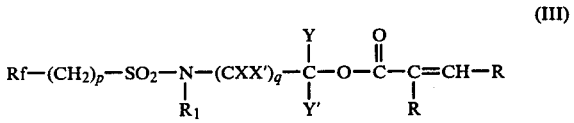

in which Rf and R have the same significance as in claim 1, p is equal to 2 or 4, q is equal to 1 or 2, $R_1$ represents hydrogen or alkyl containing 1 to 10 carbon atoms, cycloalkyl containing 5 to 12 carbon atoms, hydroxyalkyl containing 2 to 4 carbon atoms, aryl or aryl substituted by alkyl containing 1 to 6 carbon atoms, X, X', Y and Y' are identical or different, and each represents hydrogen or alkyl containing 1 to 4 carbon atoms.

6. The composition according to claim 1, wherein the monomer of formula (II) is an acrylate or methacrylate of an alkylene glycol.

7. The composition according to claim 1, wherein the component (B) is a prepolymer of polyurethane obtained by reaction of an excess of aromatic or aliphatic polyisocyanate with a polyol of molecular weight from 62 to 5,000.

8. The composition according to claim 1, wherein the catalyst is a tertiary amine or a salt of tin or of lead.

9. A process for the oil proofing and water proofing treatment of construction materials which comprises applying a composition according to claim 1 to their surface.

10. The process according to claim 9, wherein 100 g to 800 g of composition are applied per $m^2$ of surface to be treated.

11. The process according to claim 9 wherein a solution of component (A) or component (B) is first deposited on the support to be treated, and then a solution of the other of component (A) or component (B) is deposited thereon, one or both of said solutions also containing the catalyst (C).

* * * * *